Patented Oct. 2, 1934

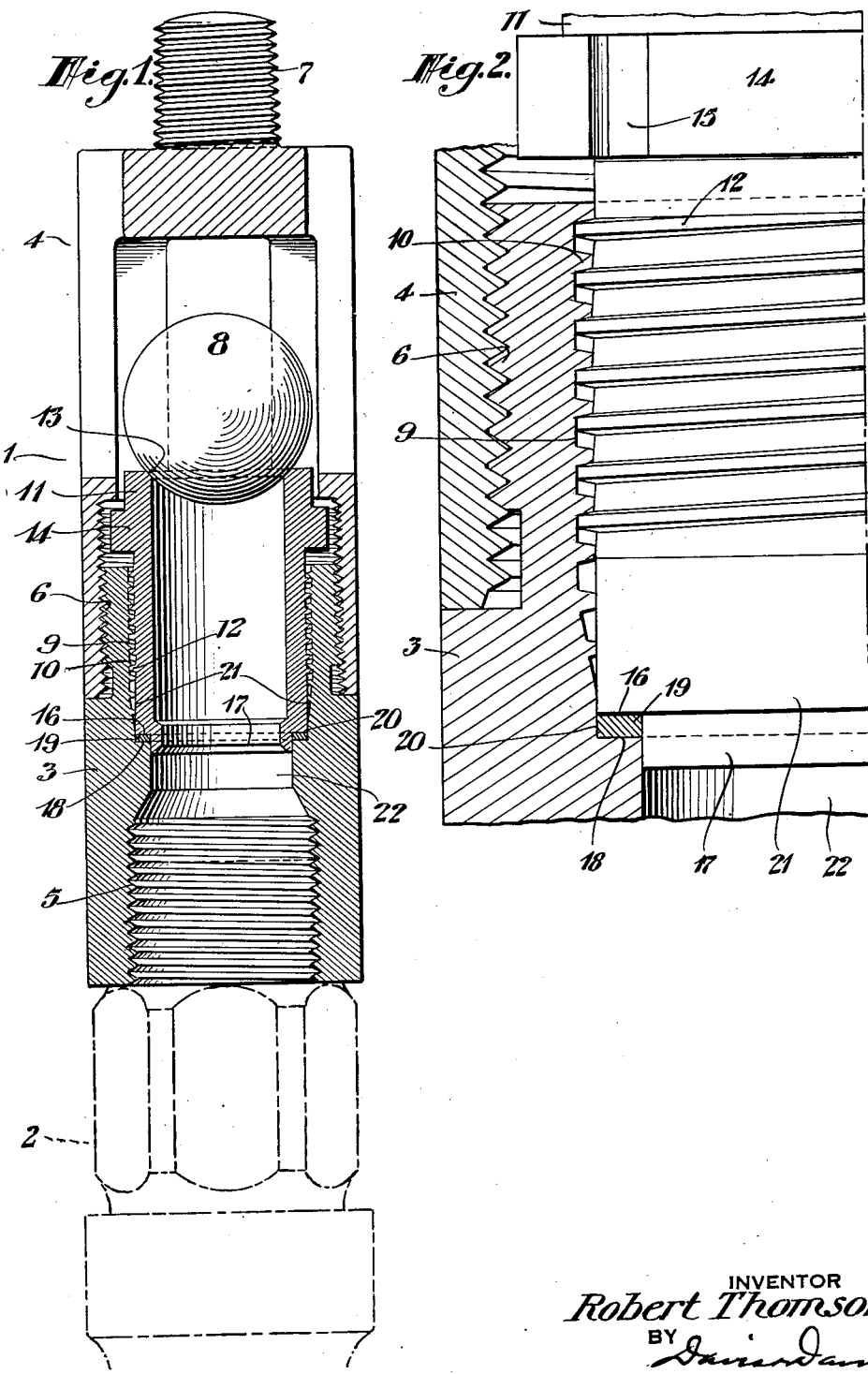

1,975,184

UNITED STATES PATENT OFFICE 1,975,184

VALVE FOR OIL WELL PUMP PLUNGERS

Robert Thomson, Arlington, N. J., assignor to Dardelet Threadlock Corporation, New York, N. Y., a corporation of Delaware Application June 24, 1931, Serial No. 546,509

1 Claim. (Cl. 251—121)

Important objects of the present invention are, to provide an improved valve seat structure for the plunger of an oil well pump; to provide such a valve seat structure employing a self-locking thread feature in an effective manner to hold the valve seat in place and prevent leakage of oil past it; and to provide a valve seat structure wherein the seat is firmly held in place and leakage is prevented by engaged screw threads which are relatively displaceable axially in one direction into self-locking engagement, in combination with a gasket which is disposed and held in a manner to strongly resist the powerful thrusts of a valve closing upon the seat under great oil pressure and thereby prevent a shift of the seat which would unlock the engaged threads. Other objects of the invention will appear hereinafter.

In the drawing, Fig. 1 is a vertical sectional view of a portion of a plunger embodying my invention; and Fig. 2 an enlarged detail sectional view showing a portion of the valve seat bushing and its mounting.

The pump plunger shown is of a standard type. It comprises a tubular upper portion 1 containing the valve and seat and adapted to be thread-coupled to the lower end of a sucker rod, and a tubular lower portion thread-coupled to the upper portion and indicated at 2 by dotted lines. Said lower portion carries the usual cup-shaped gaskets adapted to fit snugly within the working barrel in which the plunger operates.

The upper, valve-containing portion of the plunger includes a tubular casing section 3 carrying the valve seat and a casing section 4 forming a valve cage. At its lower end the tubular section 3 has a threaded socket 5 into which the upper end of portion 2 of the plunger is screwed. The upper end of section 3 is reduced and externally threaded, as at 6, and the lower end of the valve cage 4 is screwed thereon. Said cage is substantially cylindrical and has a closed upper end provided with a threaded projection 7 for screwing into the socket of a sucker rod, an open internally threaded lower end for coupling to section 3, and side openings above its threaded portion for fluid passage. A ball valve 8 is confined in the cage.

The upper end of the plunger section 3 is formed with a socket 9 of material depth having a screw thread 10. A valve seat member 11 in the form of a bushing is fitted in socket 9 and has an external screw thread 12 engaged with the internal thread 10. At its upper end the bushing has a chamfer 13 forming a tapered seat for the valve 8. For screwing the bushing into place it has an external enlargement 14 near its upper end slotted, as at 15, for engagement by a wrench or spanner. At its inner end the bushing has a flat, annular shoulder 16 and a reduced portion forming a short annular flange 17 projecting from the inner edge of said shoulder. The plunger section 3 has a flat annular shoulder 18 at the inner end of its socket 9 opposed to shoulder 16 and of the same area. Between said opposed shoulders is interposed a flat gasket 19 having a face area corresponding to that of the shoulders. The socket thread terminates above the bottom of the socket and, below the thread the socket has a smooth, cylindrical surface 20. This cylindrical surface extends to the shoulder 18 and fits closely around the edge of the gasket 19. The bushing thread terminates at a point materially above the lower end of the bushing and, below the thread, the bushing has a smooth, cylindrical surface 21 extending to the shoulder 16 and closely fitting within said cylindrical portion of the socket. The flange 17 also has a smooth cylindrical periphery which closely fits the inner edge of the gasket and closely fits within a cylindrical bore surface 22 in the section 3 below the shoulder 18. Thereby the gasket is closely and rigidly confined at all sides. The bushing and the section 3 are of hard metal, such as steel, while the gasket is of a softer metal such as copper.

The engaged screw threads 10 and 12 are complementary threads of constant pitch and as shown, are the well known, self-locking Dardelet type of screw threads disclosed in U. S. Patent No. 1,657,244. The helicoidal crest surface of thread 10 and the helicoidal root surface of thread 12 slope inward toward the outer end of the bushing and make an angle of preferably six degrees with the thread axis, this being within the angle of friction of the metals in contact. The ribs of the threads are much narrower than the grooves so that the threads are relatively displaceable one across the other for self-locking, mutual engagement. At their opposite sides the threads have helicoidal abutment surfaces making an abrupt angle to the thread axis. The bushing 11 is screwed freely into the socket 9 until the inner end of the bushing bottoms against the gasket 19 and its axial advance is stopped. Then upon further turning of the bushing the engaged threads are relatively displaced crosswise until the inclined locking surfaces are brought into tight-holding, frictional engagement and the adjacent abutment surfaces are brought into contact.

There is a cooperation of the Dardelet self-locking threads and the confined metal gasket which is an important feature of the present invention. The engaged threads 10 and 12 are self-locked by relative outward displacement of the root locking surface of thread 12 into locking engagement with the crest surface of thread 10. It is then most desirable that the bushing 11 be firmly held against inward displacement to prevent disengagement of the locking surfaces. By the confinement of the gasket as described it is enabled to resist an inward thrust upon the valve seat bushing and positively prevent inward displacement thereof.

In service, upon an upward stroke of the plunger, the valve 8 is subjected to a powerful closing impact by the column of oil above it. The pressure upon the valve may be several thousand pounds per square inch. This pressure is transmitted through the bushing 11 to the gasket 19. Lateral expansion of the gasket is prevented by its rigid confinement and it is therefore prevented from yielding to any appreciable degree under the downward thrust. By the locking engagement of the threads the bushing is also accurately centered and trued with relation to the gasket and positively gripped to hold it against wobbling on the gasket and prevent consequent admission of oil. As the bushing is screw tightened against the gasket the slightly sloping thread locking surface at the root of the bushing thread and the sloping locking surface at the crest of the socket thread cooperate to take up radial clearance therebetween, accurately center the bushing with its axis disposed at a right angle to the plane of the gasket and lock the bushing against even the slightest lateral shift as well as against unscrewing.

The self-locking threads and the confined gasket also effectually prevent leakage past the bushing 11. The bushing is firmly held against unscrewing; the closely contacting helicoidal locking surfaces of the bushing and socket threads form a preliminary seal and the closely confined gasket forms a final seal. In an oil well pump plunger it is most desirable to entirely prevent leakage past the valve for the reason that once started the leakage increases rapidly. The great pressure of the oil and the cutting action of grit which is present, quickly enlarges a slight leakage passage.

What I claim is:

In a lift pump plunger, a valve structure comprising a rigid casing having an upwardly opening socket provided with an internal screw thread and with a rigid annular abutment wall below the screw thread; an annular metal sealing gasket seated on said abutment wall; and an externally threaded bushing screwed into said socket and having an annular valve seat above the bushing thread and a rigid annular abutment wall below the thread forced by the screwing of the bushing against said gasket and holding the latter under compression, said casing having smooth, rigid annular walls above as well as below the gasket and said bushing having corresponding smooth, rigid annular walls cooperating with the aforesaid annular walls on the casing to thereby rigidly confine the gasket and enable it to positively resist inward thrust of the valve closure on the bushing, the engaged threads of the bushing and socket having clearance for material relative crosswise displacement in an axial direction, the thread ribs having abutment side faces forming an abrupt angle with the thread axis to positively limit said crosswise displacement, and the rib of the bushing thread being displaced axially outward with relation to the rib of the socket thread and into abutting contact therewith by screw tightening rotation of the bushing against the gasket without axial advance and the threads having coactive locking surfaces extending entirely around the bushing and forced into mutual locking engagement by said bushing thread displacement and holding the bushing gripped against unscrewing and against rocking on the gasket, whereby the bushing is locked to the gasket and the rigidly confined gasket prevents unlocking axial displacement of the bushing thread under end thrust.

ROBERT THOMSON.